(12) United States Patent
Locklear

(10) Patent No.: US 7,836,853 B2
(45) Date of Patent: Nov. 23, 2010

(54) AQUARIUM BOTTOM SURFACE SUBSTRATE

(76) Inventor: Mary Elizabeth Locklear, 21740 Wagram Rd., Laurinburg, NC (US) 28352

( * ) Notice: Subject to any disclaimer, the term of this patent is extended or adjusted under 35 U.S.C. 154(b) by 579 days.

(21) Appl. No.: 11/935,688

(22) Filed: Nov. 6, 2007

(65) Prior Publication Data

US 2009/0114162 A1    May 7, 2009

(51) Int. Cl.
*A01K 63/00* (2006.01)
(52) U.S. Cl. .................................. 119/256; 119/247
(58) Field of Classification Search ............ 119/245, 119/246, 247, 253, 256, 269; D30/106; 47/69; 428/27, 15, 17, 22
See application file for complete search history.

(56) References Cited

U.S. PATENT DOCUMENTS

| | | | | |
|---|---|---|---|---|
| 3,272,683 A | * | 9/1966 | Smith et al. .................. 428/221 |
| 3,452,871 A | * | 7/1969 | Finley et al. ................. 210/150 |
| 3,744,454 A | * | 7/1973 | Willinger et al. ............ 119/256 |
| 4,006,711 A | * | 2/1977 | Frank .......................... 119/256 |
| 4,318,945 A | * | 3/1982 | Goldman et al. .............. 428/15 |
| D292,831 S | * | 11/1987 | Kozy et al. ................. D30/106 |
| 4,974,545 A | * | 12/1990 | Jones .......................... 119/256 |
| 5,257,596 A | * | 11/1993 | Jones .......................... 119/256 |
| 5,365,884 A | * | 11/1994 | Jones .......................... 119/256 |
| 5,451,443 A | * | 9/1995 | Wechsler ....................... 428/99 |
| 5,855,982 A | | 1/1999 | Wechsler |
| 6,230,654 B1 | * | 5/2001 | McNeil ....................... 119/256 |
| 6,939,708 B2 | | 9/2005 | Morris et al. |
| 2003/0235896 A1 | * | 12/2003 | Kallenbach et al. ......... 435/180 |
| 2005/0244945 A1 | * | 11/2005 | Kallenbach et al. ...... 435/253.6 |

\* cited by examiner

*Primary Examiner*—Trinh T Nguyen
(74) *Attorney, Agent, or Firm*—Jim Passé; Passé Intellectual Property, LLC

(57) ABSTRACT

The present invention relates to a novel aquarium bottom surface substrate consisting of a biocompatible polymeric material with a granular aquarium substrate embedded into the polymer. In an embodiment of the invention there is also a means for attaching aquarium decorations to the aquarium bottom surface substrate to keep them firmly in position during use of the aquarium.

10 Claims, 4 Drawing Sheets

AQUARIUM BOTTOM SURFACE SUBSTRATE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a bottom surface substrate for an aquarium. In particular, the present invention relates to a molded aquarium substrate with optional aquarium decoration attachment means.

2. Description of Related Art

Display aquariums generally use some sort of substrate at the bottom of the aquarium tank for securing aquarium decorations, providing a natural looking environment, maintaining an environmental balance and generally providing a pleasing and artistic appearance of the aquarium. Typically, the bottom surface substrate of an aquarium is a granular material such as sand, gravel, aragonite, cichlid and coral. Other artificial granular materials are used including polymeric granular materials which can be easily colored and can even be made luminescent. These materials are relatively hard, dense to remain at the bottom and of relatively medium size particle. While these materials have been used for decades now in the display of fish, small retiles, and other aquatic and land creatures they present some problems in terms of maintenance and cleaning. The biggest problem comes when the aquarium is cleaned. The granular substrate must be removed, cleaned and dealt with which leads to spills difficulty in cleaning and a general mess. While these problems are certainly a source of frustration and work for the aquarium owner, the lack of alternatives has led most people to accept the limitations of the current substrate materials.

One important reason for a lack of alternatives is the ability of the current substrates to effectively act as an anchor for decorative items. These items include things such as artificial and live plants, ornamental articles and the like that act to create a particular environment from natural to fanciful in nature. Typically a decorative item is partially buried in a substrate to anchor it. Water currents, the density and weight of the particular decoration and the environment (especially with water) in general however create difficulties in not only placement of articles but in keeping the decorative items stationary once placed.

Live plants have been anchored with weights attached to the plant and items such as flat disks, etc have been added to mounting devices to attach other items. The majority of means to secure decorations work under ideal conditions but are inadequate with a more challenging environment, especially with larger fish or reptiles. As a result frequent adjustment and replacement has been necessary. One solution to the attachment problem has been disclosed in U.S. Pat. No. 5,855,982 to Wechsler Issued Jan. 5, 1999. In this patent there is described an anchoring accessory which includes a support element for reception of plants, a means for selectively positioning the accessory at one of a series of specific locations and a means for fastening an article to a support element. The claimed device is designed to work under and with granular substrate materials and while it does provide a means to anchor decorations it does nothing to avoid the problems with granular substrate materials.

While the problems with aquariums are not as great when the environment is not an aquatic one, the problems encountered with cleaning anchoring and the like are still significant. It is clear that since the problems with current substrates have existed for decades that the art is desperate for new solutions to this problem.

SUMMARY OF THE PRESENT INVENTION

It has been discovered that an aquarium bottom surface substrate can be made from a combination of granular substrate and polymeric material. The material substrate solves long standing problems with cleaning aquarium substrates. Waste is not forced down into the granular material and cleaning can be done with the substrate in place. In addition, anchoring of aquarium decorations can be done in a fixed way that is part of the substrate and not an additional part that must be used in conjunction with loose granular material.

Accordingly one embodiment of the invention comprises an aquarium bottom surface substrate comprising:
 a) a granular substrate material; and
 b) a biocompatible polymeric material molded to fit the bottom surface of an aquarium;

wherein the granular substrate material is embedded into the molded polymeric material such that a portion of the granular material extends from the surface of the polymeric material.

Yet another embodiment of the present invention comprises a kit of parts comprising:
 a) an aquarium substrate comprising a granular substrate material and a biocompatible polymeric material molded to fit the bottom surface of an aquarium wherein the granular substrate material is embedded into the molded polymeric material such that a portion of the granular material extends from the surface of the polymeric material;
 b) a plurality of means for attaching aquarium decorations to the substrate; and
 c) at least one aquarium decoration capable of attaching to the attaching means.

As can be seen there are many embodiments and one skilled in the art can modify the teachings and embodiments consistent with the teaching herein. Other benefits and surprising utility of the present invention will be further seen from the description of the invention which follows.

DETAILED DESCRIPTION OF THE INVENTION

Figure 1:
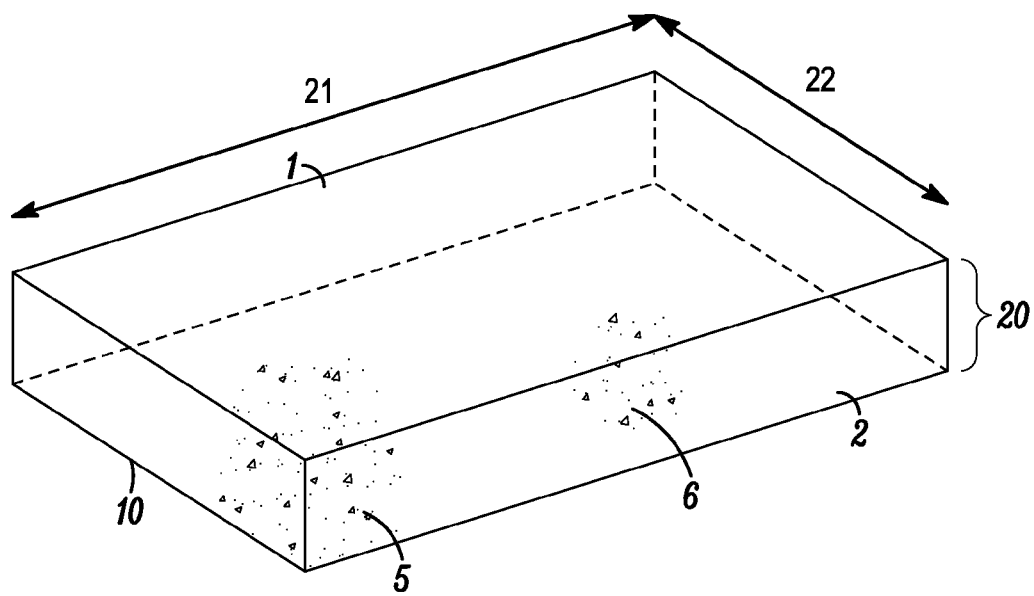
FIG. 1 is a perspective view of an embodiment of the invention

The present invention relates to an aquarium substrate consisting of a granular aquarium substrate fixed into a polymeric mat. It has been found that the appearance of the resulting substrate looks like the granular substrate alone however it is much easier to clean and very easy to remove when desired. This invention is a great step forward in that granular substrates have been used for decades and no suitable substitute has previously been found in spite of the limitations and problems with granular substrates for aquarium use.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "and an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein the term "aquarium bottom surface substrate" refers to material used at the bottom of aquariums for decorative purposes or to hold decorations and the like. Aquariums has its plain meaning and refers to glass and plastic containers usually open at the top and used primarily for aquatic animals but frequently used for small land animals such as small mammals, reptiles and the like. Where used without water, aquariums can also have side doors and the like for access to the animal and contents of the aquarium. While often terms such as vivarium and terrarium are used to describe other uses for aquariums for purposes of the discussion herein the term aquarium shall be considered inclusive of these and any related terms and devices.

As used herein the term "granular substrate material" refers to those normally loose granular materials available to the art that are used as aquarium bottom surface substrate. This includes such natural materials (natural or colored) as sand and gravel and the like but also includes artificial materials such as polymeric gravel.

As used herein the term "biocompatible polymeric material" refers to moldable polymers which can be cast into a flexible or rigid solid and are not toxic or injurious, or do not produce significant immunological response in living tissue of aquatic or animal life that may come in contact directly or indirectly with the polymer in an aquarium. In general, many biocompatible polymers are well known such as acrylic polymers for example the brand Acrylic Water and in view of this disclosure are selectable by one skilled in the art. Examples include but are not limited to polyurethanes, polycarbonates, silicone polymers, polyamides, polysulfones, polyvinyls, polyacrylics, polyesters, polyethers and the like. The present invention includes a single polymer or could include a blend of polymers for the exact properties desired and to have the highest compatibility with the granular substrate material. The polymeric material can be any color or opacity. In one embodiment the polymer is essentially clear when molded.

The biocompatible material is "molded to fit the bottom surface of an aquarium. The bottom of an aquarium can literally be any size. Most aquariums are rectangular in shape but multi-sides and round aquariums are well known. In order to simulate familiar bottom surfaces the polymeric material will be molded to fit the particular aquarium it is to be used in. So for example where the bottom surface interior measurements are 2 foot by 6 inches the width and length of the polymeric material would be just short of those measurements to fit the bottom. The thickness of the polymeric material can be done as desired but in general between about ⅜ of an inch and about 2 inches and in another embodiment between about ¾ of an inch and 1¼ inch depending on the desired look of the final product. One skilled in the art could easily make the final determination and the above described dimensions are not intended to be limiting.

The present invention aquarium bottom surface substrate is produced by embedding, for example by casting, molding or the like, a selected quantity of the granular substrate material into the polymeric material. The polymer then holds together the granular substrate. The amount of granular material selected is based on the particular look one desires with the present invention. Where replication of loose granular substrate is desired a large amount of granular substrate is added. Likewise a smaller amount can be added. In one embodiment the granular material protrudes from the surface of the polymeric material while in another it is entirely embedded in the material. In one embodiment the granular material is only on at least a portion of the polymeric material and in another embodiment it is distributed throughout the entire polymeric material. The granular substrate may be evenly distributed or may be distributed with varying amounts in different portions of the polymeric material. For example one may desire to have no granular substrate in the bottom portion of the polymeric material so the polymeric material may lie flat on the bottom surface of the aquarium.

In a further embodiment of the invention there is an anchoring means associated with the present invention. The anchoring means could be anything embedded, attached or pushed through the polymeric material which then in turn a decorative item could be attached to. In one embodiment a snap means is pushed through the polymeric material from the bottom so that the snap means protrudes from the top surface of the polymer and granular material. Then a decorative item with a corresponding attachment means for the snap can be positioned and attached to the snap means. By having multiply holes or choosing a polymer which the attachment means can be pushed through or embedding attachment means into the polymer one or more decorations can be attached. The decorations thus attached are much more stable than those just placed on or in loose granular substrate but can easily be removed for replacement or cleaning.

Since the present invention provides a means for the bottom substrate presentation the present invention could also include as an additional element, an aquarium background that by a selected means matches the present invention bottom surface substrate. One skilled in the art could easily select the backgrounds based on the present disclosure and the artistic needs of the background.

In another embodiment the substrate could also be provided with a means to remove the substrate from an aquarium. Tabs, rings, tethers and the like could be employed to aid in lifting the substrate as desired. One embodiment is to use a through the substrate means with a ring or other grabbing means to grab and lift the substrate.

The present invention can be presented as polymeric mat alone or can be sold as a kit of parts with the present invention, the attachment means and one or more attachable decorations. In addition, the kit of parts could include the above described aquarium background.

Now referring to the drawings; FIG. 1 is a perspective of the present invention the aquarium bottom surface substrate 1 the polymeric material 2 is shown in this embodiment as clear rectangular molded polymer. It could be either a rigid or flexible polymer as desired. In this perspective granular material 5 is distributed within the polymeric material all the way to the bottom 10 of the polymeric material granular material 6 is embedded entirely within the polymeric material and does not extend to the bottom 10. While the granular materials 5 and 6 are shown in only a portion of the polymer and distributed in two different ways one skilled in the art could either evenly or unevenly distribute the granular material as desired. The particular embodiment of the substrate 1 is shown with a height 20, length 21, and width. In this embodiment no decoration or attachment means are shown.

Figure 2A:
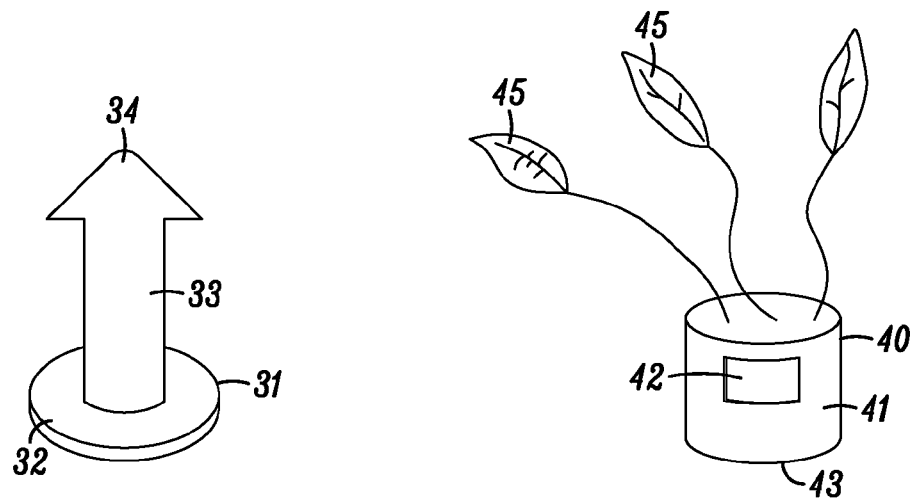
FIG. 2a is a perspective view of an attachment means of the invention with a matching decorative aquarium piece.

FIG. 2a is a perspective view of an attachment means of the invention with a matching decorative aquarium piece. The attachment means 31 has a base 32, body shaft 33 and a snap means 34. Aquarium decoration 40 is depicted as a crude artificial aquatic plant. It includes a decorative base 41 have an opening 42 which when the attachment means 31 is inserted into decorative piece bottom 43 moves up until snap means 34 moves into opening 42 holding it in place. The aquarium plant 45 is show for illustrative purposes and could be any aquarium decorative item with the attachment base 41 on it.

Figure 2B:
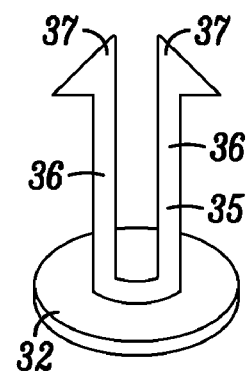
FIG. 2b is a perspective view of an alternative embodiment of the attachment means for aquarium decorations.

FIG. 2b shows an alternative embodiment of an attachment means. Attachment means 35 has a base 32 but has dual shafts 36 in a spread apart manner with dual snaps 37. The attachment means 35 would attach to base 41 from FIG. 2a in the same manner. While snap means are shown other attachments means could in view of the disclosure be used including things such as pressure fittings, O-ring attachments, tied on decorations and the like. In view of the disclosure one skilled in the art could design alternative attachment means without undue experimentation.

Figure 2C:
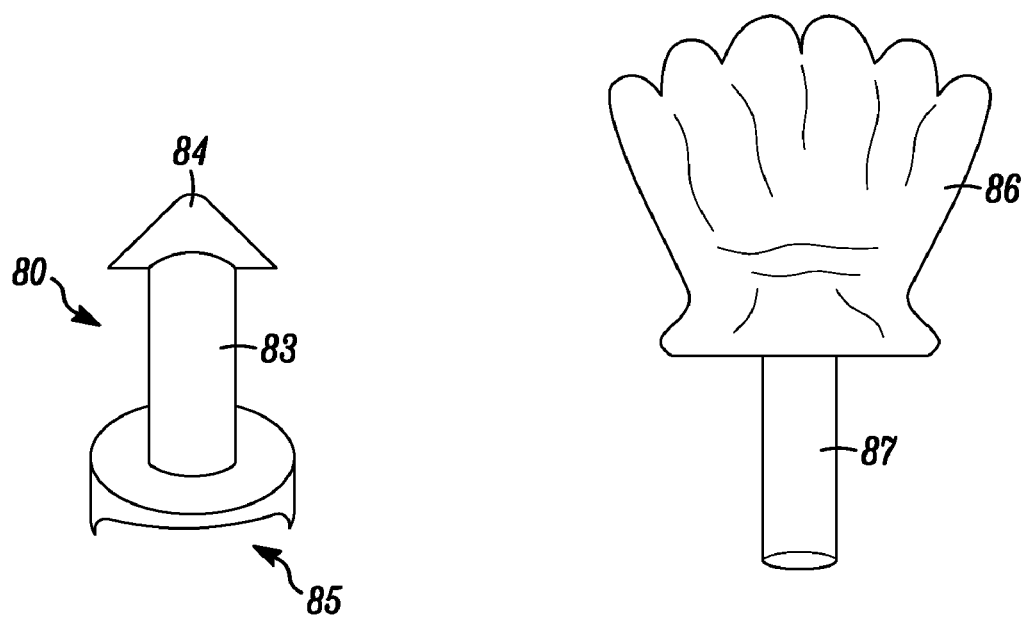
FIG. 2c is a perspective view of an alternative embodiment of the attachment means with a push on decoration.

FIG. 2c depicts yet another embodiment of attachment means. In this view, attachment means 80 consists of shaft 83 and friction tip 84. Suction base 85 is a suction means which will stick to the bottom of the aquarium. The corresponding decoration 86 has hallow shaft 87 which slides over shaft 83 and is held in place by the friction between tip 84 and the inside of hallow shaft 87.

Figure 3A:
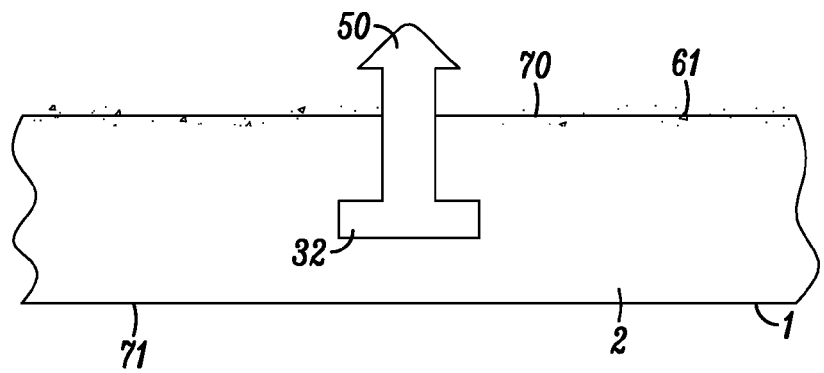
FIG. 3a is a partial side view of the present invention with an embedded attachment means and granular material only on the top.
Figure 3B:
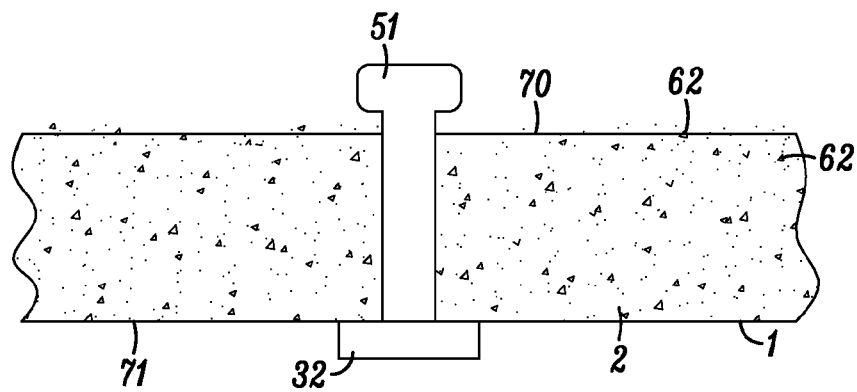
FIG. 3b is a partial side view of the present invention with a through the polymer attachment means and the granular material evenly distributed.
Figure 3C:
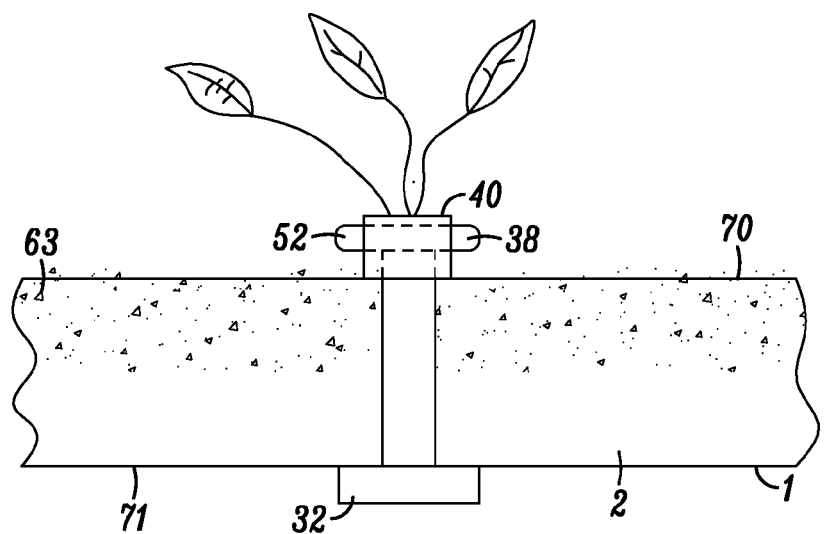
FIG. 3c is a partial side view of the present invention with an attachment means and a decorative plant attached thereto and granular material partially distributed throughout the polymer.

FIGS. 3a, 3b and 3c show partial side view of the polymer with embedded granular material showing various granular embeddings as well as different ways of using the attachment means with the present invention substrate. FIG. 3a shows the attachment means 50 embedded within the polymeric material. Also granular material 61 is only embedded in the top surface 70 of the polymeric material. The remainder of the polymeric material 2 is without granular material 61. In view 3b the attachment means 51 is pushed through the polymeric material 2. The base 32 protruding from the bottom 71 of polymeric material 2. The base 32 could also be in a recess, not shown of the polymeric material so that the base 32 is flush with the bottom 71 of the polymeric material. In this view granular substrate 62 is evenly distributed in the polymeric material 2. In FIG. 3c once again an attachment means 52 is shown as through the polymeric material 2 with the base 32 outside the polymeric material bottom 71. In this view a decorative plant 40 is attached to the attachment means 52 with the protrusion means 38 protruding through holes 42, not visible from this view. The granular substrate 63 in this view is distributed in an upper portion of the polymeric material 2 leaving the bottom portion of the polymeric material 2 free of granular material 63. Inn all of these views the selected polymer is a clear polymer but opaque and colors could also be selected as desired.

Figure 4:
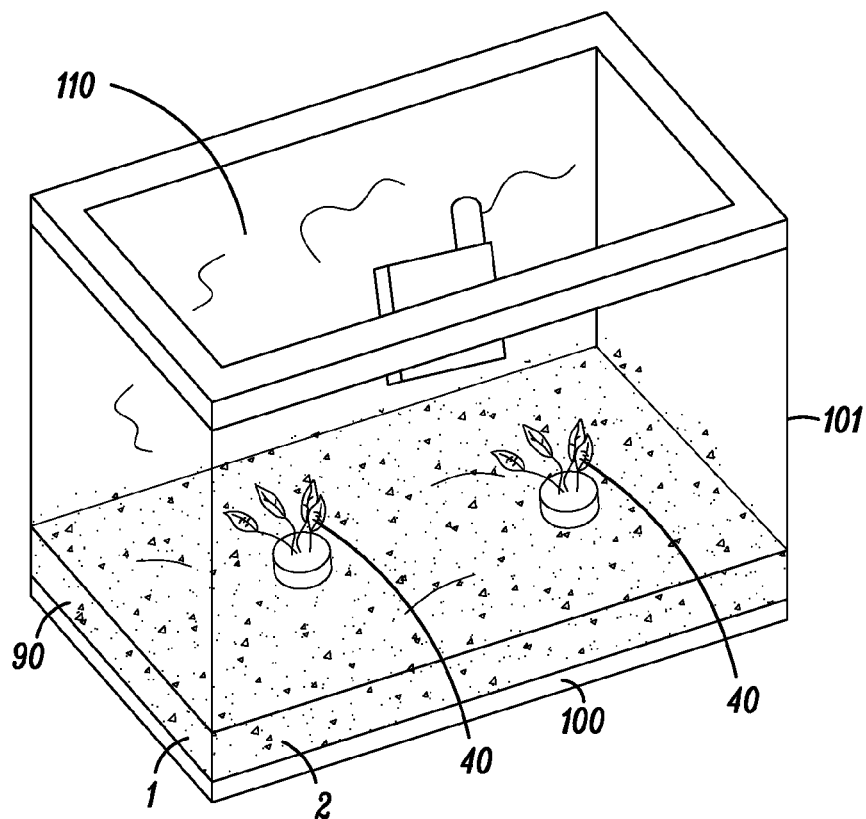
FIG. 4 is an embodiment of the present invention with aquarium decorations and aquarium backdrop in an aquarium.

FIG. 4 is an embodiment of the present invention in use in an aquarium with the optional aquarium backdrop. The present aquarium bottom substrate 1 consisting of granular material 90 and polymer 2 is placed in the bottom of aquarium 101. The granular material 90 is shown as distributed throughout the polymer 2. Also shown are two decorative plants attached to attachment means not shown as hidden underneath the base 41 of the decorative plant 40.

FIG. 4 also shows decorative backdrop 110. The backdrop 110 is show without a particular design but could be a photograph, drawing color or any background typical for an aquarium.

Figure 5:
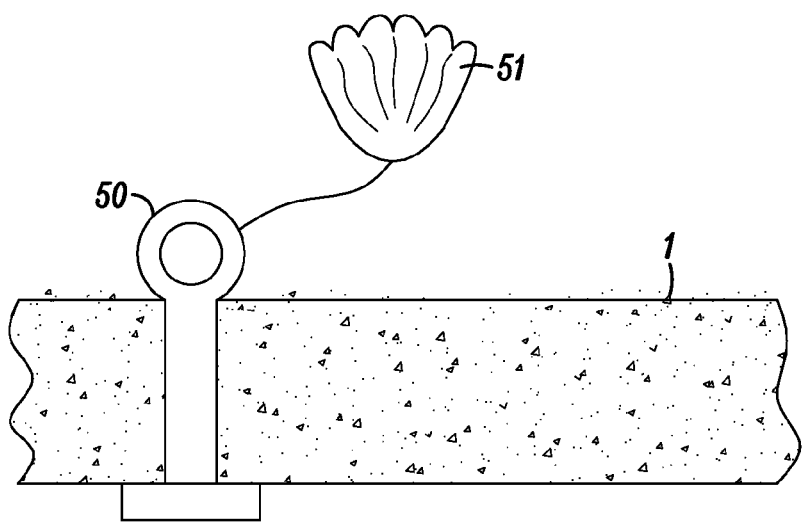
FIG. 5 is a view of an embodiment comprising a lift out means to aid in removing the substrate from an aquarium.

FIG. 5 depicts the substrate 1 with lift out means 50. The lift out means 50 is similar to a decorative anchor but comprises a ring or other grabbing means that will enable the user to grab the means 50 and lift and remove the substrate 1 from an aquarium tank. One or more lift out means 50 can be provided as necessary. In one embodiment there are two lift out means. Decorations 51 can also be designed to attach to the lift out means 50 to hide or decorate the lift out means 50.

The drawings and the descriptions thereof are not intended to be limiting selection of attachment means granular substrate and polymer and the like can be selected based on the drawings and the disclosure and no such limitation should be read upon the claims which follow.

What is claimed is:

1. A kit of parts comprising:
   a) an aquarium substrate comprising a granular substrate material and a biocompatible polymeric material molded to fit the bottom surface of an aquarium wherein the granular substrate material is embedded into the molded polymeric material;

b) a plurality of means for attaching aquarium decorations to the substrate; and c) at least one aquarium decoration capable of attaching to the attaching means.

2. A kit of parts according to claim 1 wherein the kit further comprises a decorative aquarium background.

3. A kit of parts according to claim 1 wherein at least a portion of the granular substrate extend from the surface of the polymeric material.

4. A kit of parts according to claim 1 wherein the kit further comprises one or more substrate lift out means.

5. A substrate according to claim 1 wherein the polymeric material is essentially clear.

6. A substrate according to claim 1 wherein the means for attaching aquarium decorations is a snap means positioned through the substrate.

7. A substrate according to claim 6 wherein there is a plurality of holes through the substrate for repositioning the attaching means to a desired location.

8. A substrate according to claim 1 wherein the means for attaching aquarium decorations is a snap means positioned by molding into the substrate.

9. A substrate according to claim 1 which further comprises decorations attached to the snap means.

10. A substrate according to claim 1 wherein the granular material is luminescent.

* * * * *